US011789116B2

(12) United States Patent
Valdes Garcia et al.

(10) Patent No.: US 11,789,116 B2
(45) Date of Patent: Oct. 17, 2023

(54) MULTI-DIRECTION PHASED ARRAY CALIBRATION

(71) Applicant: International Business Machines Corporation, Armonk, NY (US)

(72) Inventors: Alberto Valdes Garcia, Chappaqua, NY (US); Petar K. Pepeljugoski, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 494 days.

(21) Appl. No.: 16/581,647

(22) Filed: Sep. 24, 2019

(65) Prior Publication Data

US 2021/0088625 A1    Mar. 25, 2021

(51) Int. Cl.
*G01S 7/40* (2006.01)

(52) U.S. Cl.
CPC .............. *G01S 7/40* (2013.01); *G01S 7/4008* (2013.01); *G01S 7/4021* (2013.01); *G01S 7/4013* (2021.05)

(58) Field of Classification Search
CPC ........ G01S 7/40; G01S 7/4008; G01S 7/4021; G01S 7/4013; G01S 7/4082; G01S 7/4026
USPC ......................................................... 342/174
See application file for complete search history.

(56) References Cited

U.S. PATENT DOCUMENTS

| | | | | |
|---|---|---|---|---|
| 5,559,519 A * | 9/1996 | Fenner | ..................... | G01S 7/032 342/174 |
| 5,644,316 A * | 7/1997 | Lewis | ................... | G01S 7/4008 342/174 |
| 7,408,507 B1 | 8/2008 | Paek et al. | | |
| 9,568,593 B2 * | 2/2017 | Ahmed | ................... | G01S 13/89 |
| 9,780,447 B2 | 10/2017 | Maca et al. | | |
| 9,791,552 B1 * | 10/2017 | Schuman | .............. | G01S 7/4026 |
| 11,056,784 B1 * | 7/2021 | Agon | ..................... | H04B 17/21 |
| 2005/0001760 A1 * | 1/2005 | Mrstik | ................... | H01Q 3/267 342/174 |

(Continued)

FOREIGN PATENT DOCUMENTS

| | | | | |
|---|---|---|---|---|
| CN | 106357351 A | * | 1/2017 | |
| EP | 2362485 A1 | * | 8/2011 | ......... H01Q 21/0018 |

(Continued)

OTHER PUBLICATIONS

T. Takahashi, Y. Konishi and I. Chiba, "A Novel Amplitude-Only Measurement Method to Determine Element Fields in Phased Arrays," in IEEE Transactions on Antennas and Propagation, vol. 60, No. 7, pp. 3222-3230, Jul. 2012, doi: 10.1109/TAP.2012. 2196961 (Year: 2012).*

(Continued)

*Primary Examiner* — Olumide Ajibade Akonai
(74) *Attorney, Agent, or Firm* — Daniel Morris; Otterstedt & Kammer PLLC (57) ABSTRACT

A radar reflector is positioned at a predetermined angle and distance from a device to be tested. The device to be tested includes at least one of a transmit phased array antenna and a receive phased array antenna. At least two antenna elements of the at least one of a transmit phased array antenna and a receive phased array antenna are activated to carry out one of transmitting and receiving. A plurality of phase control settings are cycled through to determine an optimum phase control setting for the predetermined angle.

19 Claims, 9 Drawing Sheets

(56) References Cited

U.S. PATENT DOCUMENTS

| | | | | |
|---|---|---|---|---|
| 2009/0153394 A1* | 6/2009 | Navarro | ................ | G01S 7/4017 |
| | | | | 342/174 |
| 2012/0235858 A1* | 9/2012 | Dougherty | ............ | G01S 7/4026 |
| | | | | 342/169 |
| 2016/0043465 A1* | 2/2016 | McDevitt | ................ | G01S 13/91 |
| | | | | 342/368 |
| 2018/0115064 A1 | 4/2018 | Safavi-Naeini et al. | | |
| 2018/0136313 A1* | 5/2018 | Genghammer | .... | H04B 17/0085 |
| 2018/0294564 A1* | 10/2018 | Kim | ........................ | G01S 13/02 |

FOREIGN PATENT DOCUMENTS

| | | | | | |
|---|---|---|---|---|---|
| EP | 2993811 | B1 | * | 8/2017 | ........... G01R 25/005 |
| GB | 2318010 | A | * | 4/1998 | ........... G01S 7/4052 |
| GB | 2580997 | A | * | 8/2020 | ............... G01S 7/40 |
| RU | 2674432 | C1 | * | 12/2018 | |
| WO | WO-2018020315 | A1 | * | 2/2018 | ........... A61B 8/0808 |

OTHER PUBLICATIONS

K. R. Dandekar, Hao Ling and Guanghan Xu, "Smart antenna array calibration procedure including amplitude and phase mismatch and mutual coupling effects," 2000 IEEE International Conference on Pers. Wireless Communications. Conf. Proc.(Cat.No. 00TH8488), 2000, pp. 293-297, doi: 10.1109/ICPWC.2000.905822 (Year: 2000).*

Gasperin et al., Systematic Effects in LOFAR Data: A Unified Calibration Strategy, Astronomy & Astrophysics manuscript No. LOFARcal, arXiv:1811.07954v1 [astro-ph.IM] Nov. 19, 2018, pp. 1-20.

Akinwale Oluwaseyi Fadamiro et al., A Fast and Accurate Multi-Element Calibration Algorithm of an Active Phased Antenna Array, Progress in Electromagnetics Research M, vol. 78, pp. 49-58, 2019, PIER, Accepted Jan. 13, 2019, Scheduled Jan. 17, 2019.

Ilgin Seker, "Calibration methods for phased array radars", Proc. of SPIE vol. 8714 87140W-1, Downloaded From: http://proceedings.spiedigitallibrary.org/on Nov. 18, 2015 pp. 1-15.

* cited by examiner

MULTI-DIRECTION PHASED ARRAY CALIBRATION

BACKGROUND

The present invention relates to the electrical, electronic and computer arts, and more specifically, to calibration of phased array antennas.

A phased array antenna system may have a variety of antennas. A beam can be formed in space using the set of antennas. With appropriate supporting circuitry, electronic beam steering can be carried out; that is, the beam can be moved electronically from one direction to another. It is anticipated that phased arrays will be mass-produced for fifth-generation (5G) mobile telephony networks and beyond. Other potential applications include radar imaging. To ensure that the beams are formed correctly, the phased array should be calibrated. The calibration compensates for the gain and phase imperfections between front ends and antennas to provide coherent combining of the power from multiple elements.

A general radar imaging system includes (1) waveform generation, (2) waveform acquisition, (3) a transmitter that transmits the waveform into the scene in one more directions, (4) a receiver that receives reflected signals (receiver), and (5) one or more hardware or software components to discern the direction from which the signals are reflected and/or the strength of the received reflected signals. A phased array antenna system can be used to form transmit and receive radar beams in specific directions.

SUMMARY

Principles of the invention provide techniques for multi-direction phased array calibration. In one aspect, an exemplary method includes the step of positioning a radar reflector at a predetermined angle and distance from a device to be tested, the device to be tested including at least one of a transmit phased array antenna and a receive phased array antenna; activating at least two antenna elements of the at least one of a transmit phased array antenna and a receive phased array antenna to carry out one of transmitting and receiving; and cycling through a plurality of phase control settings to determine an optimum phase control setting for the predetermined angle.

In another aspect, an exemplary system includes a device to be tested, the device to be tested including at least one of a transmit phased array antenna and a receive phased array antenna; a radar reflector positionable at a predetermined angle and distance from the device to be tested; a signal and processing block coupled to the at least one of a transmit phased array antenna and a receive phased array antenna and configured to activate at least two antenna elements of the at least one of a transmit phased array antenna and a receive phased array antenna to carry out one of transmitting and receiving; and a phase and amplitude control block configured to cycle through a plurality of phase control settings to determine an optimum phase control setting for the predetermined angle.

In still another aspect, an exemplary test apparatus is provided for testing a device to be tested; the device to be tested includes at least one of a transmit phased array antenna and a receive phased array antenna. The test apparatus includes a fixture configured to receive the device to be tested; a radar reflector positionable at a predetermined angle and distance from the fixture; a signal and processing block configured to be coupled to the at least one of a transmit phased array antenna and a receive phased array antenna and configured to activate at least two antenna elements of the at least one of a transmit phased array antenna and a receive phased array antenna to carry out one of transmitting and receiving; and a phase and amplitude control block configured to cycle through a plurality of phase control settings to determine an optimum phase control setting for the predetermined angle.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of the following:

calibration can be carried out without radiation pattern measurements and other complex electromagnetic radiation measurements which result in high cost and lengthy calibration;

calibration can be carried out using waveforms that are straightforward to generate and detect;

multiple beam directions can be calibrated simultaneously;

can be applied in the field where a reflector is present at a known distance;

reduced calibration time.

These and other features and advantages of the present invention will become apparent from the following detailed description of illustrative embodiments thereof, which is to be read in connection with the accompanying drawings.

DETAILED DESCRIPTION

Aspects of the invention provide techniques for multi-direction phased array calibration and/or radar-based phased array calibration.

As noted above, a phased array system may have a variety of antennas. A beam can be formed in space using the set of antennas. With appropriate supporting circuitry, electronic beam steering can be carried out; that is, the beam can be moved electronically from one direction to another. It is anticipated that phased arrays will be mass-produced for fifth-generation (5G) mobile telephony networks and beyond. To ensure that the beams are formed correctly, the phased array should be calibrated. Phased array calibration is a complex and time consuming task. The calibration compensates for the gain and phase imperfections between front ends and antennas to provide coherent combining of the power from multiple elements. Traditional methods rely on radiation pattern measurements and other complex electromagnetic radiation measurements which result in high cost and lengthy calibration. The required equipment is quite expensive and bulky, especially for millimeter wave applications (e.g. wavelengths from ten to one millimeter). One or more embodiments advantageously provide techniques to perform calibration using baseband radar waveforms, thus obviating the need for expensive high-frequency equipment. As will be appreciated by the skilled artisan, "baseband" typically indicates frequencies starting at zero; i.e., a signal having content close to zero and continuing up to a certain bandwidth. In some instances, devices under test (DUTs) have a baseband input. However, in other cases, DUTs could have an input at intermediate frequencies (IF). As compared to prior-art techniques requiring complex RF measurements, one or more embodiments, whether baseband or IF, use waveforms that are straightforward to generate and detect. Further, one or more embodiments provide an extension to calibrate multiple beam directions simultaneously. Even further, one or more embodiments provide faster and lower-cost calibration as compared to prior art techniques.

Figure 1:
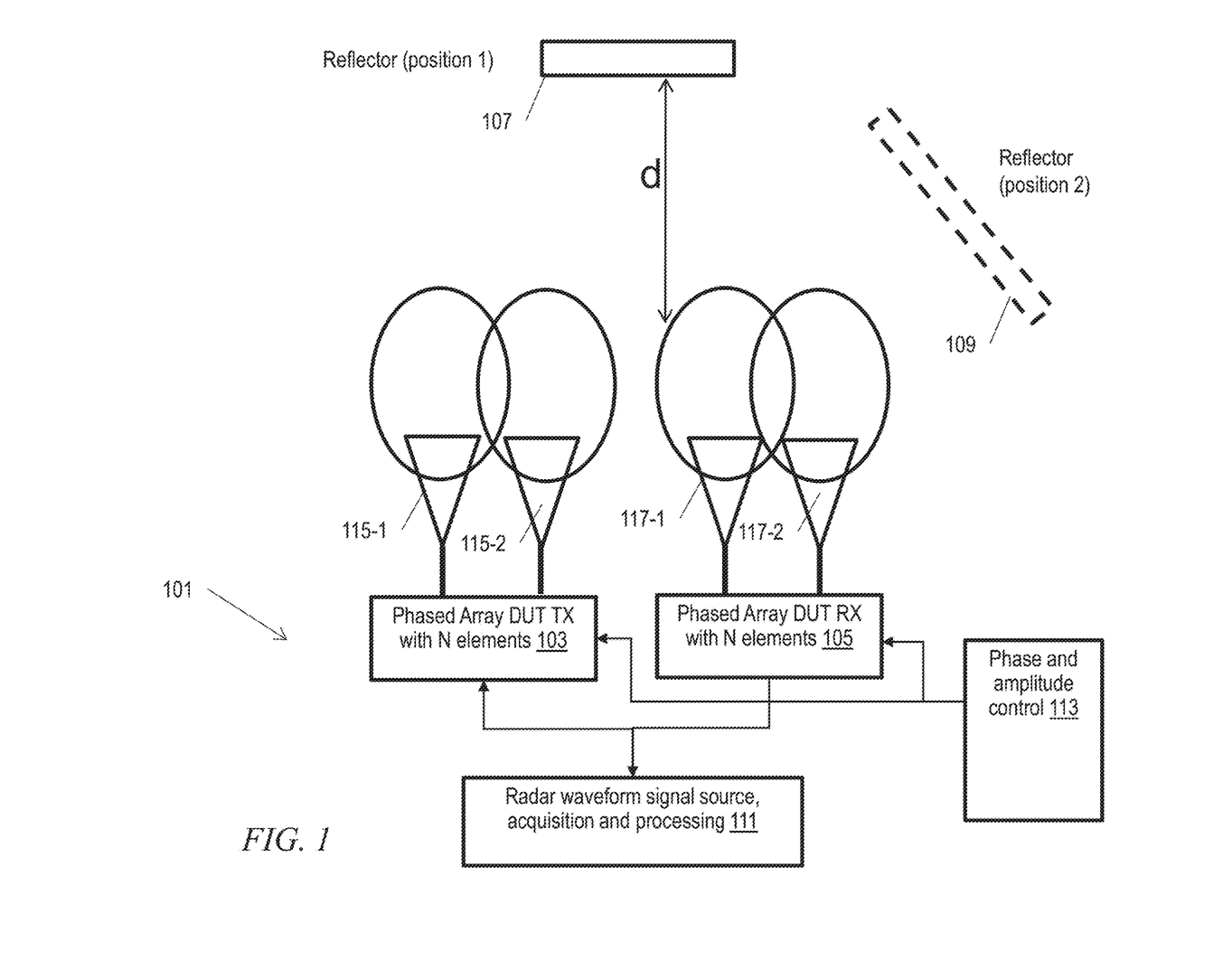
FIG. 1 depicts a radar-based beam steering calibration system according to an embodiment of the present invention.

Referring to FIG. 1, the phased array device under test (DUT) 101 can include a transmitter 103 or a receiver 105. In some instances, the DUT is a module including both a transmitter and a receiver. By way of example, consider calibration of a phased array transmitter 103. A receiver is also employed, which may or may not be a phased array and may or may not be integrated in the same module as the transmitter. In the example of FIG. 1, the transmitter and receiver each have N antenna elements. Two transmitter elements 115-1 and 115-2 are shown, and two receiver elements 117-1 and 117-2 are shown. In general, the transmitter and receiver may or may not have the same number of elements. A reflector 107 (e.g. a simple piece of metal) is located at a predetermined distance d from the DUT.

Another reflector 109 is provided at another position in some embodiments, and/or reflector 107 is movable to other positions such as from "position 1" to "position 2." Radar waveform signal source, acquisition and processing block 111 is provided to inject the radar waveform into the transmitter DUT 103, which signal is reflected by the reflector 107 to the receiver 105. Phase and amplitude control of the transmitter DUT are provided by block 113. In an embodiment, the radar signal source, acquisition and processing block 111 includes (1) a code-modulated radar waveform generator, which can be implemented by a pseudo random bit sequence (PRBS) generator, (2) passive and/or active electronic components to couple such waveform to the transmitter DUT, (3) an ADC coupled to the receiver, and (4) a software component to perform cross-correlation operations between a copy of the transmitted waveform and the receive waveform. In another embodiment, the radar signal source, acquisition and processing block 111 includes (1) a frequency ramp radar waveform generator, (2) passive and/or active electronic components to couple such waveform to the transmitter DUT, (3) a mixer to multiple a copy of the transmitted signal and the received signal, (4) and ADC to digitize the output of the mixer, and (5) a software component to perform fast Fourier transform (FFT) on the output of the mixer.

In a non-limiting example, phase and amplitude control block 113 makes use of a digital control interface to permit programming of the phased array via communication with the DUT. The interface can be serial or parallel. The logic in block 113 can be implemented, for example, by a field-programmable gate array (FPGA), microcontroller, general-purpose computer, or the like. Suitable cabling can be provided to the DUT. Manual analog controls could be used instead, if desired. Logic in block 113 communicates with the DUT to change the phase and amplitude settings of a given antenna element in the array. Block 113 generates binary commands that are understandable by the chip of the DUT. In a non-limiting example, block 113 includes software to implement the described logic, with a suitable hardware interface to the DUT. In some cases, the software can be embedded within the overall calibration routine software code.

Figure 2:
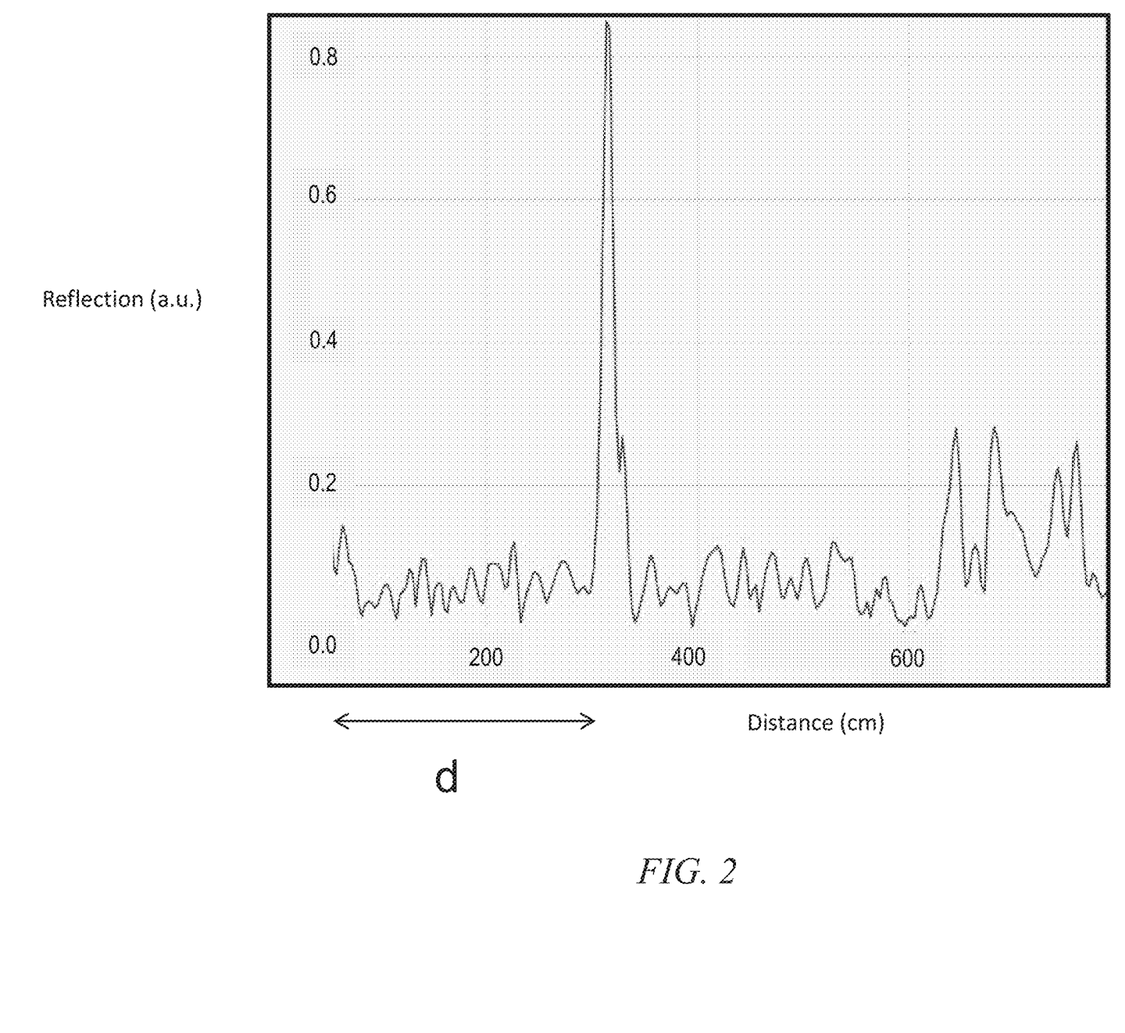
FIG. 2 depicts exemplary radar output for the system of FIG. 1.

Through standard radar signal processing, a radar output plot such as that depicted in FIG. 2 can be obtained. In the x-axis, the distance (e.g., d, in cm) at which objects are located can be seen. The y-axis shows the corresponding signal strength (in arbitrary units) of a reflection caused by an object at that distance. Here, a peak is seen at distance d. One or more embodiments search for the combination of phase and amplitude values which yield the largest magnitude at that particular distance. The amplitude of the radar output at the distance d will be maximum when the DUT beam (transmit or receive as the case may be) has its maximum gain in the direction of the reflector. Since the reflector 107 is at a known location, if the calibration test set-up does not have another reflector at the same distance, all that is required is to sweep through the potential values to determine the maximum amplitude. This is simpler than phase-related measurements and/or full-pattern measurements. When the transmitter forms a beam in the direction of the reflector, as a consequence, the reflected amplitude will be higher where nothing else is changed in the receiver. If a proper beam is being formed, essentially all the energy should be directed to the place where the reflector is located such that the amplitude should be large at that point. This technique can be applied in the field as long as there is a reflector at a known distance, for example a car radar could re-calibrate with a nearby reflective surface such as a door of a protective enclosure for the car.

When it is desired to calibrate another direction, the reflector is moved to a new position (e.g. position 2) corresponding to the second direction it is desired to calibrate. Alternatively, the angle of the module with respect to the reflector can be changed, for example through a motor mechanically coupled to the DUT.

In some instances, instead of searching through all the values of the array one-by-one until a maximum is obtained, which is effective but potentially time-consuming, calibration can be carried out in pairs (calibrating two antennas at a time). For example, if there are eight antennas, four pairs of antennas can be calibrated. In one or more embodiments, such pair-wise calibration is advantageous because it is possible to search for a minimum in addition to a maximum. For example, when the energy from antennas in a certain direction is perfectly cancelled, the phases are 180 degrees apart. Accordingly, some embodiments search for perfect cancellation and then "flip" the phase 180 degrees.

Figure 3:
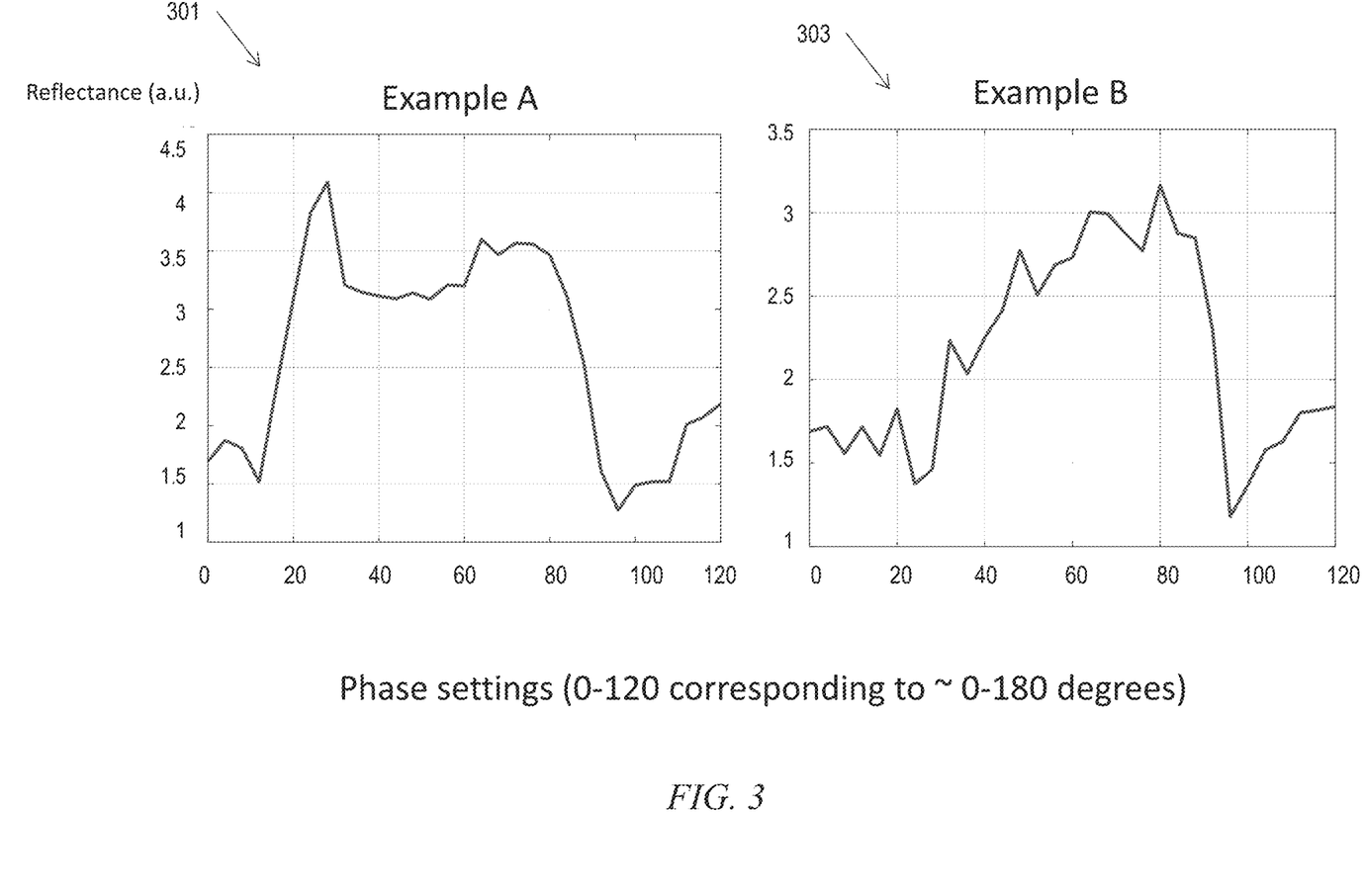
FIG. 3 depicts alternative exemplary radar output for the system of FIG. 1.

Searching for a "notch" instead of a "peak" can be attractive on some instances because of the following: if two sinusoidal signals are plotted such that the x-axis is the relative phase between the two signals and the y-axis is the resulting amplitude, the "notch" is sharp but the "peak" is broad/soft such that the "notch" is easier to detect in some instances than the "peak." Referring to FIG. 3, two examples are shown of pertinent steps in a transmitter calibration process, for a pair of antennas, according to aspects of the invention, looking for a "notch." In Example A, denoted 301, the vertical axis plots, in arbitrary units, strength (amplitude) of the signal that comes back from the reflector, as received by the receiver, and after the radar processing. The horizontal axis plots the fine control phase settings for one phase shifting element in the DUT, wherein settings 0-120 correspond to approximately 0-180 degrees. It is worth noting that the DUT has an additional bit control that can cause 180 degrees phase shift in one coarse step. When the phase of the signal sent to the two antennas of interest is the same, there is coherent power combining and a high amplitude is noted beginning at about setting 25 On the other hand, there is an instance in which the phase between the two antennas of interest is close to 180 degrees and a cancellation effect is seen between phase setting 80 and phase setting 100, approximately 90. In a non-limiting example, a setting of 90 is the optimum and the complement (180 degrees out of phase from setting of 90, using the coarse step mentioned above) is used for the actual setting. Example B, denoted 303, shows a plot for a different exemplary pair of antennas. Here, high amplitude is noted between phase settings of about 65-80, after which the amplitude declines to a low value at a phase setting of around 95. A value 180 degrees out of phase from setting of 95 is used for the actual setting in this example. Please note that the similarity of the optimal values at 90 in Example A and 95 in Example B is coincidental and other examples might diverge.

It will thus be appreciated that the maximum can be selected as the optimum, or that the minimum can be selected and the actual optimum value set 180 degrees from the minimum. The minimum may be clearer than the maximum in one or more embodiments.

Now consider receiver calibration. A transmitter radiates energy in the direction of the reflector. A receiver beam refers to a certain zone in space for which the array exhibits higher antenna gain as compared to other directions. The receiver calibration problem is the dual of the transmitter calibration problem except that one is looking for maximum antenna gain or else minimum gain followed by a 180 degree "flip."

Figure 4:
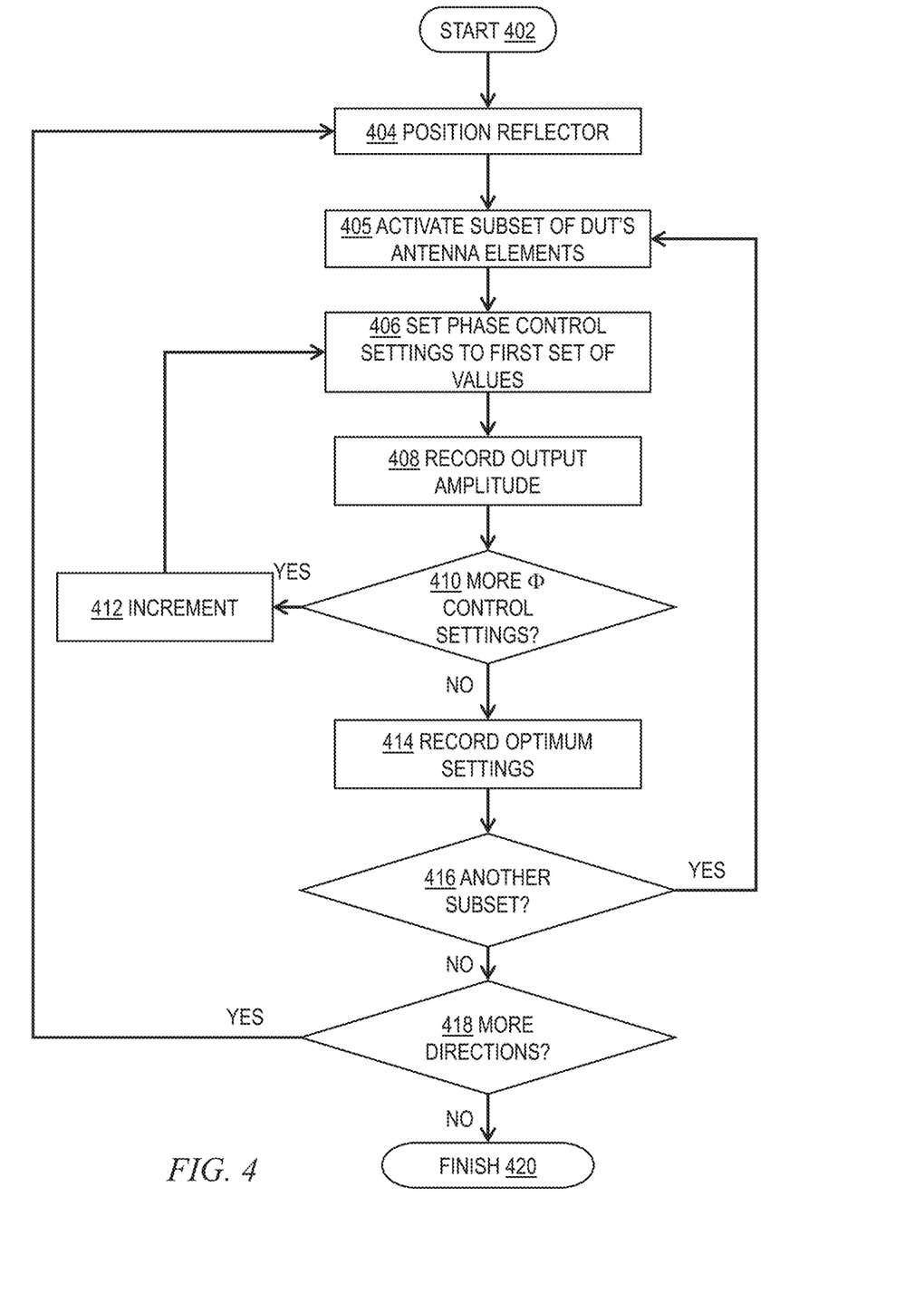
FIG. 4 depicts a flow chart of an exemplary method according to an embodiment of the present invention.

Referring now to the flow chart of FIG. 4, which begins at 402, in step 404, position the reflector with respect to the DUT in the desired beam direction. In step 405, activate the subset (in a non-limiting example, two) of the DUT's N antenna elements to be calibrated. In step 406, set the DUT's phase control settings to a first set of values. In step 408, record the resultant radar output amplitude corresponding to the distance of the reflector. As indicated by decision block 410 and incrementing step 412, repeat steps 406 and 408 (via YES branch) for each set of possible phase control settings from 1 to M (follow NO branch once all values have been considered; M is the possible range of values for a given phased array configuration, as will be apparent to the skilled artisan given the teachings herein). In step 414, record the set of phase control settings that yields the largest radar output; this is the optimum set for that particular beam direction. Alternatively, for a two-element antenna array subset, the minimum value can be found, which corresponds to the optimum phase settings inverted by 180 degrees.

In one or more embodiments, this algorithm takes care of calibrating phase differences between antennas. As mentioned elsewhere, amplitude differences also exist and they may need to be calibrated. To account for these, a number of options are possible. In one aspect, step 406 includes setting both phase and amplitude control settings to a first set of values. Those skilled in the art, given the teachings herein, will know how to define the full set combining phase and amplitude settings. In another aspect, referring to FIG. 9, a specific way to perform phase and amplitude calibration, which may be more practical in some cases, is to add another loop after step 414, where amplitude values are swept. In the case of the 'notch' finding approach, the notch will be deeper once amplitude values match. In step 906, set the DUT's amplitude control settings to a first set of values. In step 908, record the resultant radar output amplitude corresponding to the distance of the reflector. As indicated by decision block 910 and incrementing step 912, repeat steps 906 and 908 (via YES branch) for each set of possible amplitude control settings from 1 to M (follow NO branch once all values have been considered; M is the possible range of values for a given phased array configuration, as will be apparent to the skilled artisan given the teachings herein). In step 914, record the set of amplitude control settings that yields the largest radar output; this is the optimum set for that particular beam direction (or find minimum and add 180 degrees). Then return to step 416.

In some instances, phase and amplitude knobs are not independent. However, the skilled artisan, given the teachings herein, will be able to define a suitable set of values and the number of loops to use.

Figure 9:
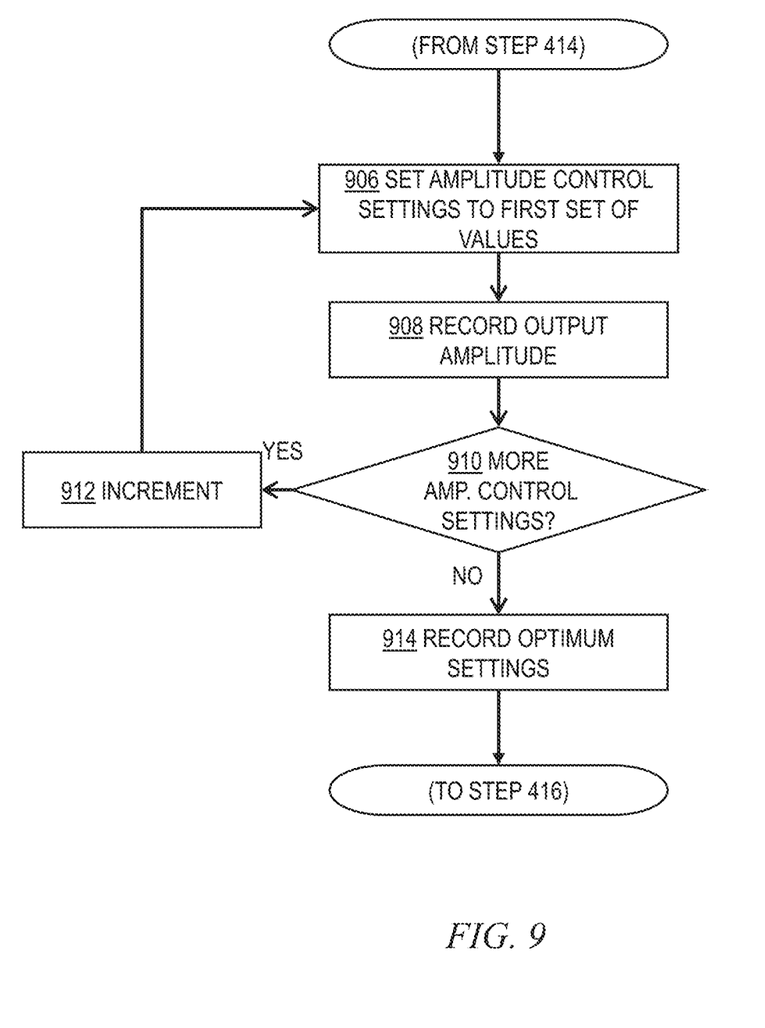
FIG. 9 shows a flow chart of optional additional steps for the method of FIG. 4.

As indicated by decision block 416, if an additional subset of antennas is to be calibrated (YES branch), return to step 405. Steps/blocks 404 through 416 are repeated for all desired beam directions to be calibrated, as indicated by YES branch of decision block decision block 418 (block 418 is reached via NO branch of block 416 once all subsets have been completed). Processing concludes at 420, reached via NO branch of block 418 once all directions are complete. Where the optional steps in FIG. 9 are undertaken, they are repeated as well.

In some instances, the reflectors could be located at two different distances, d1 and dz. Suppose the reflector at position 2 in FIG. 1 is further away than the reflector at position 1. This would result in two peaks instead of one in the plot of FIG. 2. The amplitude of both peaks would change while running through the phase and amplitude values, and the process would effectively calibrate both directions at the same time. While checking for each of the M settings, the corresponding settings that result in maximum (or minimum as the case may be) would be found for both direction 1 and direction 2.

Figure 5:
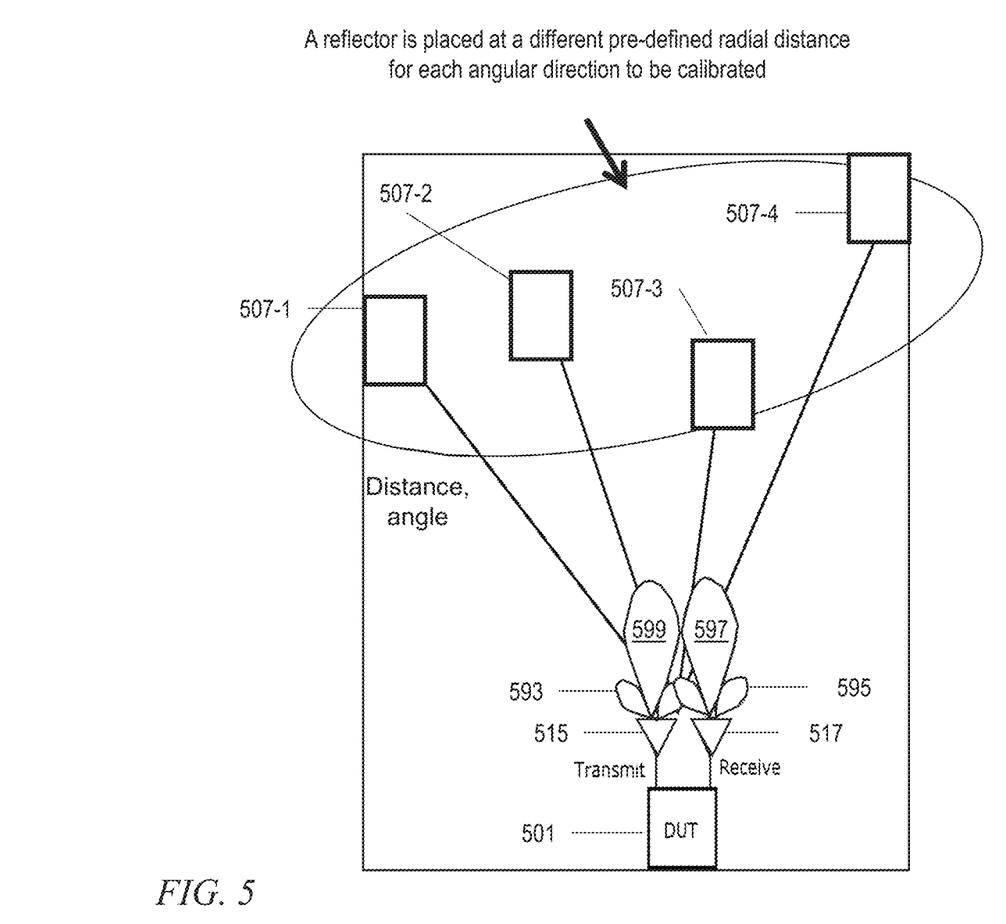
FIG. 5 depicts a radar-based beam steering calibration system according to an embodiment of the present invention, extended for multiple directions.

Refer to FIG. 5 which depicts multiple reflectors 507-1, 507-2, 507-3 and 507-4 at different angles and different distances. Because of the different distances, different peaks would be noted on plots similar to that of FIG. 2, and calibration data for all the different multiple directions is gathered simultaneously. Note the DUT 501 with transmit antenna 515 and receive antenna 517, either or both of which can be phased arrays. The transmit array 515 has a pattern including main lobe 599 and two side lobes 593, only one of which is numbered to reduce clutter. The receive array 517 has a pattern including main lobe 597 and two side lobes 595, only one of which is numbered to reduce clutter. Thus, in one or more embodiments, to extend to multiple directions, a reflector is placed at a different pre-defined distance for each direction to be calibrated. As the gain and phase of different elements is being swept, the optimum values for a given steering angle can be found by observing the amplitude of the reflection at the distance corresponding to that angle. Since all of the reflectors are present, the relevant information for all desired angles is being collected at the same time, minimizing calibration time.

Figure 6:
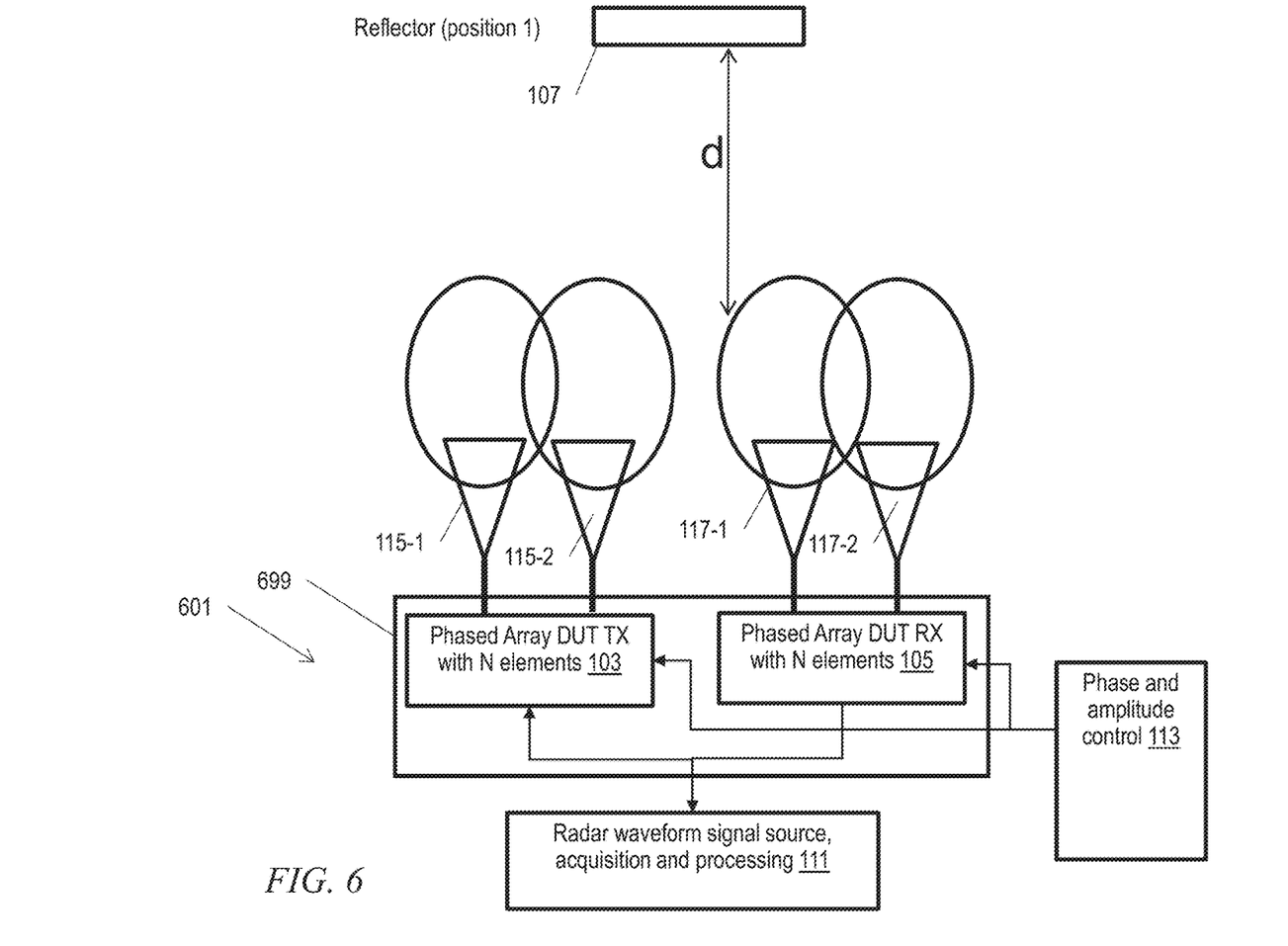
FIG. 6 depicts a radar-based beam steering calibration system according to an alternative embodiment of the present invention.

FIG. 6 shows a set-up similar to FIG. 1, except that only a single reflector 107 is provided in position 1, and a motion stage 699 is provided for rotation and/or translation under control of a suitable motor, gear train, linear actuator, etc. In some cases, the transmitter 103 and received 105 can be on the same board and can move together via stage 699; however, in other embodiments, the stage only adjusts one of the transmitter and receiver at a time (the DUT). Advantageously, calibration with such a set-up can be carried out in the field, and even if there are other reflections (say from a wall), the procedure discards those and focused on the signal coming back from the reflector at the position of interest.

Figure 7:
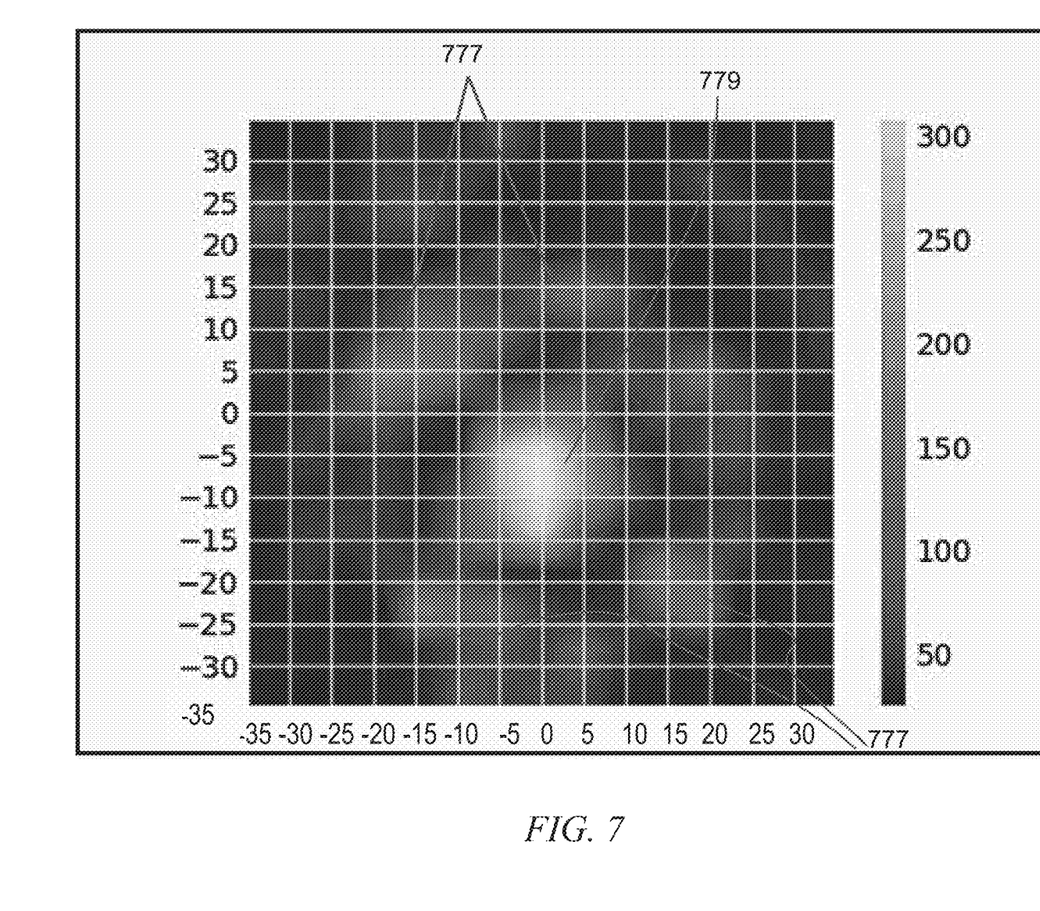
FIG. 7 depicts exemplary post-calibration radar imaging results obtained with the set-up of FIG. 6.

FIG. 7 shows a radar image with, on the x and y axes, the angles at which both the transmitter and receiver beams are being steered with optimum values obtained after calibration (at the same time, via electronic beam steering). The bright region 779 shows when both beams are being pointed in the direction of the reflector 607. The "halos" 777, not all of which are numbered, to reduce clutter, correspond to side lobes.

In a non-limiting exemplary experiment, using the calibration algorithm described, we have calibrated a 60-GHz phased array evaluation board in 225 different beam directions (+/−35 degree range in both vertical and horizontal directions in steps of 5 degrees). The image of FIG. 7 shows initial post-calibration radar imaging results. The plots show reflectivity at 1.9 m.

One pertinent advantage of one or more embodiments is that prior art techniques require measurement of the actual beam pattern—instead of making use of a reflector as in one or more embodiments, prior-art techniques require a movable antenna with complex radio frequency (RF) equipment and time-consuming measurements. Indeed, in contrast, one or more embodiments do not require such complexity but rather treat the calibration device as a radar employing easy-to-generate radar waveforms and easy-to-measure reflected signal strength.

One or more embodiments use a test setup that is less complex and/or less costly than prior art techniques such as near-field scanning, and/or are faster for large antenna arrays with many elements. One or more embodiments are suitable for in-the field calibration, and/or do not require very precise movement of the probe in front of each element.

In one or more embodiments, as compared to prior-art peripheral fixed probe techniques, there is no undesirable aperture size increase, prior coupling measurement and in-factory calibration are not needed, and/or there is not an undesirable wide dynamic range in the magnitudes of the couplings between peripheral probes and elements of larger phased arrays.

In one or more embodiments, as compared to prior-art calibration line techniques, high-cost extra hardware behind the antennas is not needed, prior in-factory calibration is not needed, and/or re-calibration at the factory is not needed when the characteristics of a transmission line, coupler, or antenna element change in time (for example due to aging or replacement).

In one or more embodiments, as compared to prior-art mutual coupling techniques, on/off switches and separate channels for simultaneous transmit and receive are not needed; element spacing (and patterns) in row and column directions need not necessarily be uniform (symmetric); dummy elements are not needed at the periphery for small arrays; and/or a smart algorithm is not needed to detect and avoid faulty elements.

One or more embodiments advantageously permit initial optimization of delay and attenuation (gain/phase) and/or do not require sophisticated device(s) in front of the DUT. One or more embodiments do not require cycling through many possible combinations of phases, amplitudes and directions and/or do not require external mmWave hardware.

It is worth noting that one or more embodiments are applicable for a DUT that has both a TX phased array and an RX phased array. However, this is not a requirement; if the DUT is a phased array TX, the RX does not necessarily require phased array functionality, it just needs to be able to receive the reflection. Likewise, when calibrating a phased array receiver, the transmitter just needs to be able to have radiation towards the reflector. In one or more embodiments, when calibrating the phased array TX, use fixed settings for the RX which was forming a broad beam. If a DUT happens to have both TX and RX phased array, this is advantageous however if both are not present techniques disclosed herein still apply with alternative implementation of the missing function (TX or RX as the case may be).

Given the discussion thus far, it will be appreciated that, in general terms, an exemplary method, according to an aspect of the invention, includes the step 404 of positioning a radar reflector 107 at a predetermined angle and distance from a device to be tested 101. The device to be tested includes a transmit phased array antenna 103 and/or a receive phased array antenna 105. A further step 405 includes activating at least two antenna elements (e.g. 115-1 and 115-2 and/or 117-1 and 117-2) of the at least one of a transmit phased array antenna and a receive phased array antenna to carry out one of transmitting and receiving. A still further step (e.g. 406, 408, 410, 412) includes cycling through a plurality of phase control settings to determine an optimum phase control setting for the predetermined angle (recorded, for example, in step 414).

It is worth noting that if the reflector is planar it will typically have to be close to normal to the antenna array so that in can produce a meaningful reflection. If a non-planar reflector is used, then some deviation from a normal direction could be tolerated. For example, there are standard, inexpensive devices called 'corner reflectors' which could be employed in some embodiments.

Some embodiments further include repeating the activating and cycling steps for at least two additional antenna elements of the at least one of a transmit phased array antenna and a receive phased array antenna, as seen at decision block 416 YES branch.

Some embodiments further include repeating the positioning, activating and cycling steps for at least one additional predetermined angle and distance from the device to be tested, as seen at decision block 418 YES branch; this can be done with or without repeating the activating and cycling steps for the at least two additional antenna elements.

The activating can include, in some instances, as the case may be, transmitting or receiving in a millimeter wave range.

In some instances, the control settings include phase and amplitude for each of the at least two antenna elements.

In some embodiments, the cycling through the plurality of phase control settings to determine the optimum phase control setting for the predetermined angle includes determining a maximum reflection amplitude at a distance corresponding to the predetermined distance. As noted, alternatively, the cycling through the plurality of phase control settings to determine the optimum phase control setting for the predetermined angle includes determining a minimum reflection amplitude at a distance corresponding to the predetermined distance and shifting by one hundred eighty degrees.

Referring to FIG. 5, in some cases, the radar reflector includes a first radar reflector (e.g. 507-1) and the predetermined angle and distance include a first predetermined angle and distance, and further steps include positioning a second radar reflector (e.g. 507-2) at a second predetermined angle and distance from the device to be tested. Both the second predetermined angle and distance are different than the first predetermined angle and distance. A further step includes activating at least two antenna elements of the at least one of a transmit phased array antenna and a receive phased array antenna to carry out at least one of transmitting and receiving; and cycling through a plurality of phase control settings to determine an optimum phase control setting for the predetermined angle. It is worth noting that, in order to calibrate effectively in different directions, each reflector 507-1, 507-2, 507-3, 507-4 should be at a different distance, so that a different uniquely identifiable peak (as in FIG. 2) will be noted for each (i.e. at a different unique distance). Otherwise, confusion can result if reflectors are at different angles but the same distance.

In another aspect, an exemplary system includes a device to be tested 101, 501, 601. the device to be tested includes at least one of a transmit phased array antenna 103, 515 and a receive phased array antenna 105, 517. Also included are a radar reflector 107, 109, 507-1, 507-2, 507-3, 507-4, positionable at a predetermined angle and distance from the device to be tested; a signal and processing block 111 coupled to the at least one of a transmit phased array antenna and a receive phased array antenna and configured to activate at least two antenna elements of the at least one of a transmit phased array antenna and a receive phased array antenna to carry out at one of transmitting and receiving; and a phase and amplitude control block 113 configured to cycle through a plurality of phase control settings to determine an optimum phase control setting for the predetermined angle. The radar reflector is positionable in the sense that the reflector is fixed and the DUT is movable with respect to the reflector and/or the reflector is movable with respect to the (fixed) DUT when it is desired to calibrate another direction.

Phase and amplitude control can be provided, for example, via software coupled to an I/O interface; in general, phase and amplitude control can be provided, for example, via circuitry, software, a mixture of both, an FPGA, or the like. Input and output frequencies for the DUT are unknown in some instances. DUTs from different companies may have different interface values. If it is desired to offer a test fixture for use with DUTs from different manufacturers, it may be desirable for block 111 to have an interface with configurable input and output frequencies.

Thus, in some cases, the signal and processing block and the phase and amplitude control block are implemented in software; in other instances, the signal and processing block and the phase and amplitude control block are implemented in at least one field programmable gate array. Combinations and/or other implementations can also be used.

In some cases, the signal and processing block and the phase and amplitude control block are configured to repeat the activating and cycling for at least two additional antenna elements of the at least one of a transmit phased array antenna and a receive phased array antenna.

In some cases, the signal and processing block and the phase and amplitude control block are configured to repeat the positioning, activating and cycling for at least one additional predetermined angle and distance from the device to be tested.

The system can also include a fixture configured to receive the device to be tested; stage 699 is one example but where the DUT is stationary and the reflector(s) move, the fixture can include, for example, electrical connectors with a fixed mechanical clamp to a base or the like.

In still another aspect, a test apparatus is provided for testing a device to be tested. The device to be tested includes at least one of a transmit phased array antenna and a receive phased array antenna. The test apparatus includes a fixture (e.g. as discussed just above) configured to receive the device to be tested; a radar reflector 107, 109, 507-1, 507-2, 507-3, 507-4 positionable at a predetermined angle and distance from the fixture; a signal and processing block 111 configured to be coupled to the at least one of a transmit phased array antenna and a receive phased array antenna and configured to activate at least two antenna elements of the at least one of a transmit phased array antenna and a receive phased array antenna to carry out one of transmitting and receiving; and a phase and amplitude control block 113 configured to cycle through a plurality of phase control settings to determine an optimum phase control setting for the predetermined angle.

In this aspect, the test apparatus can be provided, for example, by a manufacturer without any DUT, and the DUT is mounted on the apparatus for testing by a user in the field.

Figure 8:
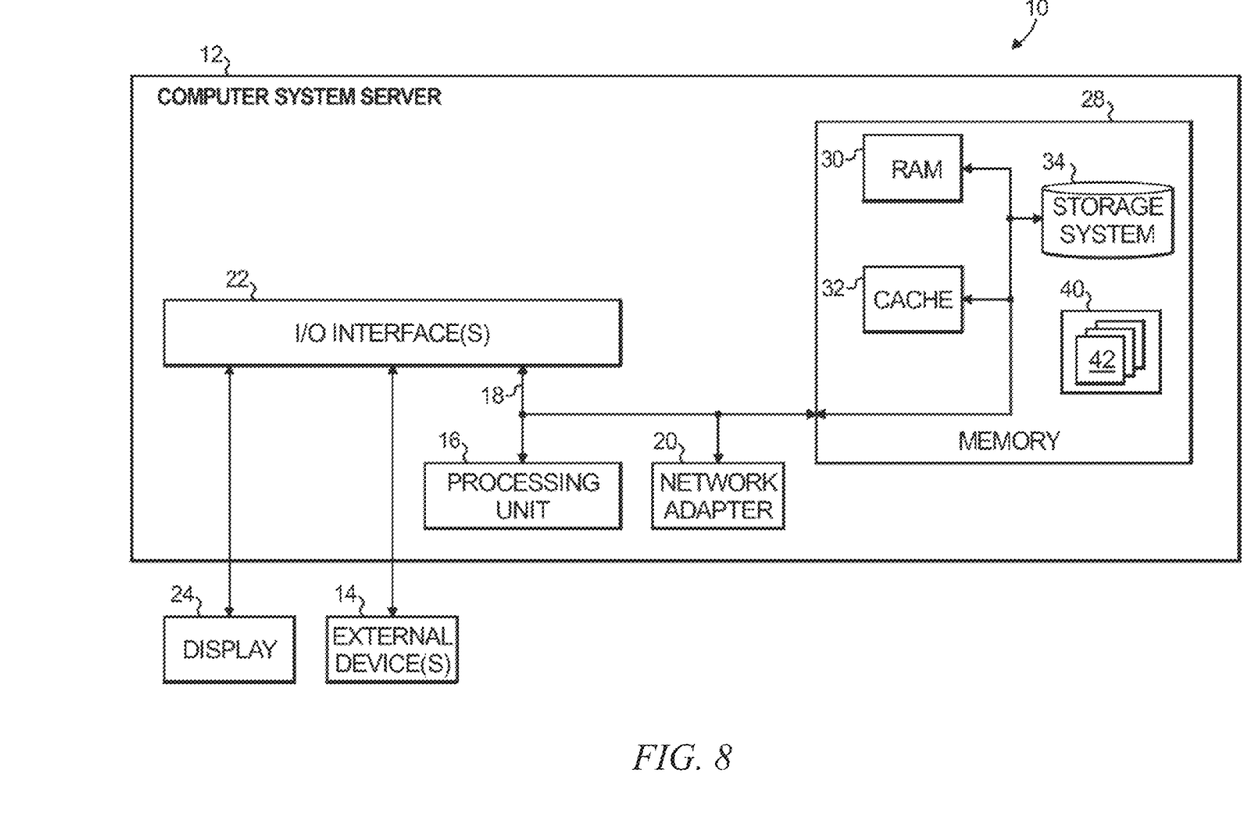
FIG. 8 depicts a computer system that may be useful in implementing one or more aspects and/or elements of the invention.

One or more embodiments of the invention, or elements thereof, can be implemented in the form of an apparatus including a memory and at least one processor that is coupled to the memory and operative to perform exemplary method steps. FIG. 8 depicts a computer system that may be useful in implementing one or more aspects and/or elements of the invention (e.g. phase and amplitude control 113). Referring now to FIG. 8, system 10 is only one example and is not intended to suggest any limitation as to the scope of use or functionality of embodiments of the invention described herein. Regardless, system 10 is capable of being implemented and/or performing any pertinent aspects of the functionality set forth hereinabove.

In system 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types.

As shown in FIG. 8, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc. In some instances, phase and amplitude and/or other control is provided by coupling system 12 to blocks 111 and/or 113 and/or stage 699 to control displacement and/or rotation of the board and/or reflector(s) via interface(s) 22 and/or adapter 20.

Thus, one or more embodiments can make use of software running on a general purpose computer or workstation. With reference to FIG. 8, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 8) running a server program. It will be understood that such a physical server may or may not include a display and keyboard.

Refer to the discussions of block 111 above. The reflected signal strength at the distance of the reflector can be obtained after radar processing (FFT or cross-correlation). Some embodiments have an analog-to-digital converter (ADC) connected to a PC or other computing device (generally, system 12) and carry out the radar signal processing in software. Alternatively a digital signal processor (DSP) or FPGA carries out the radar processing close to the ADC (close to block 111 in general), which produces a set of reflectivity values at different distances, and then the calibration algorithm is implemented in a PC or other computing device (generally, system 12) that connects to such FPGA or DSP. Data can be provided to system 12 via, for example, interface(s) 22 and/or adapter 20.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    positioning a radar reflector at a predetermined angle and distance from a device to be tested, said device to be tested comprising at least one of a transmit phased array antenna and a receive phased array antenna;
    activating at least two antenna elements of said at least one of a transmit phased array antenna and a receive phased array antenna to carry out one of transmitting and receiving; and
    cycling through a plurality of phase control settings to determine an optimum phase control setting for said predetermined angle, wherein said cycling comprises setting each of said phase control settings sequentially and wherein at least one of said phase control settings in said cycle is a non-optimal phase control setting, wherein said cycling through said plurality of phase control settings to determine said optimum phase control setting for said predetermined angle comprises determining a maximum reflection amplitude at a distance corresponding to said predetermined distance.

2. The method of claim 1, further comprising repeating said activating and cycling steps for at least two additional antenna elements of said at least one of a transmit phased array antenna and a receive phased array antenna.

3. The method of claim 2, further comprising repeating said positioning, activating and cycling steps for at least one additional predetermined angle and distance from said device to be tested.

4. The method of claim 1, further comprising repeating said positioning, activating and cycling steps for at least one additional predetermined angle and distance from said device to be tested.

5. The method of claim 1, wherein said at least one of a transmit phased array antenna and a receive phased array antenna comprises said transmit phased array antenna and said activating comprises transmitting in a baseband wave range during a calibration phase.

6. The method of claim 1, wherein said at least one of a transmit phased array antenna and a receive phased array antenna comprises said received phased array antenna and said activating comprises receiving in a baseband wave range during a calibration phase.

7. The method of claim 1, wherein each phase control setting comprises a phase and an amplitude for each of said at least two antenna elements and wherein said cycling comprises setting the phase control setting based on said phase and said amplitude.

8. The method of claim 1, wherein said radar reflector comprises a first radar reflector and said predetermined angle and distance comprise a first predetermined angle and distance, further comprising:
    positioning a second radar reflector at a second predetermined angle and distance from said device to be tested, said second predetermined angle and distance being different than said first predetermined angle and distance;
    activating at least two antenna elements of said at least one of a transmit phased array antenna and a receive phased array antenna to carry out at one of transmitting and receiving; and
    cycling through a plurality of phase control settings to determine an optimum phase control setting for said predetermined angle.

9. A system comprising:
- a device to be tested, said device to be tested comprising at least one of a transmit phased array antenna and a receive phased array antenna;
- a radar reflector positionable at a predetermined angle and distance from said device to be tested;
- a signal and processing block coupled to said at least one of a transmit phased array antenna and a receive phased array antenna and configured to activate at least two antenna elements of said at least one of a transmit phased array antenna and a receive phased array antenna to carry out one of transmitting and receiving; and
- a phase and amplitude control block configured to cycle through a plurality of phase control settings to determine an optimum phase control setting for said predetermined angle, wherein said cycle operation comprises setting each of said phase control settings sequentially, wherein at least one of said phase control settings in said cycle is a non-optimal phase control setting, and wherein said cycling through said plurality of phase control settings to determine said optimum phase control setting for said predetermined angle comprises determining a minimum reflection amplitude at a distance corresponding to said predetermined distance and shifting by one hundred eighty degrees.

10. The system of claim 9, wherein said signal and processing block and said phase and amplitude control block are implemented in software.

11. The system of claim 9, wherein said signal and processing block and said phase and amplitude control block are implemented in at least one field programmable gate array.

12. The system of claim 9, wherein said signal and processing block and said phase and amplitude control block are configured to repeat said activating and cycling for at least two additional antenna elements of said at least one of a transmit phased array antenna and a receive phased array antenna.

13. The system of claim 12, wherein said signal and processing block and said phase and amplitude control block are configured to repeat said positioning, activating and cycling for at least one additional predetermined angle and distance from said device to be tested.

14. The system of claim 9, wherein said signal and processing block and said phase and amplitude control block are configured to repeat said activating and cycling for at least two additional antenna elements of said at least one of a transmit phased array antenna and a receive phased array antenna, wherein said signal and processing block and said phase and amplitude control block are configured to repeat said setting and cycling for at least one additional predetermined angle and distance from said device to be tested, and wherein the phase and amplitude control block is configured to search for a minimal notch in the minimum reflection amplitude.

15. A test apparatus for testing a device to be tested, the device to be tested comprising at least one of a transmit phased array antenna and a receive phased array antenna, the test apparatus comprising:
- a fixture configured to receive the device to be tested;
- a radar reflector positionable at a predetermined angle and distance from the fixture;
- a signal and processing block configured to be coupled to the at least one of a transmit phased array antenna and a receive phased array antenna and configured to activate at least two antenna elements of the at least one of a transmit phased array antenna and a receive phased array antenna to carry out one of transmitting and receiving; and
- a phase and amplitude control block configured to cycle through a plurality of phase control settings to determine an optimum phase control setting for said predetermined angle, wherein said cycle operation comprises setting each of said phase control settings sequentially, wherein at least one of said phase control settings in said cycle is a non-optimal phase control setting, and wherein said cycling through said plurality of phase control settings to determine said optimum phase control setting for said predetermined angle comprises determining a maximum reflection amplitude at a distance corresponding to said predetermined distance.

16. The test apparatus of claim 15, wherein said signal and processing block and said phase and amplitude control block are implemented in software.

17. The test apparatus of claim 15, wherein said signal and processing block and said phase and amplitude control block are implemented in at least one field programmable gate array.

18. The test apparatus of claim 15, wherein said signal and processing block and said phase and amplitude control block are configured to repeat said activating and cycling for at least two additional antenna elements of the at least one of a transmit phased array antenna and a receive phased array antenna.

19. The test apparatus of claim 18, wherein said signal and processing block and said phase and amplitude control block are configured to repeat said positioning, activating and cycling for at least one additional predetermined angle and distance from the device to be tested.

* * * * *